United States Patent
Redfern et al.

[11] 3,850,006
[45] Nov. 26, 1974

[54] PORTABLE COOLING UNIT FOR CONNECTION WITH AUTOMOBILE AIR CONDITIONER

[76] Inventors: Howard W. Redfern, 121 Lookout Dr.; William P. Coleman, 631 Martin St., both of Clarksville, Tenn. 37040

[22] Filed: June 22, 1973

[21] Appl. No.: 372,767

[52] U.S. Cl. .................. 62/216, 62/237, 62/244, 62/299, 62/438, 62/439, 62/457, 62/298, 62/337, 62/243
[51] Int. Cl. ........................................... F25b 41/04
[58] Field of Search ............ 62/438, 439, 299, 457, 62/298, 244, 237, 337, 243, 216

[56] References Cited
UNITED STATES PATENTS

| | | | |
|---|---|---|---|
| 1,938,141 | 12/1933 | Goldkind | 62/244 |
| 2,007,288 | 7/1935 | Thomson | 62/299 |
| 2,540,649 | 2/1951 | Boylan | 62/299 |
| 2,585,360 | 2/1952 | Williams | 62/299 |
| 2,596,037 | 5/1952 | Maniscalco | 62/237 |
| 2,718,763 | 9/1955 | Burgess | 62/243 |
| 3,123,986 | 3/1964 | Lukas | 62/337 |
| 3,166,912 | 1/1965 | Patrick | 62/337 |
| 3,468,369 | 9/1969 | Tetrick | 62/299 |
| 3,507,322 | 4/1970 | Tetrick | 62/299 |
| 3,721,104 | 3/1973 | Adler | 62/439 |

*Primary Examiner*—William J. Wye
*Attorney, Agent, or Firm*—Clarence A. O'Brien & Harvey B. Jacobson

[57] ABSTRACT

A portable cooler having a built-in cooling unit and quick connector assemblies adapted to be connected into an automotive air conditioning system whereby the portable cooler may be conveniently located in the trunk area of an automobile but readily removable therefrom for use when picnicking, boating, camping or the like. The portable cooler includes an insulated container having a cooling unit incorporated therein which eliminates the use of meltable ice which conventionally occupies considerable space and frequently results in the material in the portable cooler being water soaked.

7 Claims, 4 Drawing Figures

PORTABLE COOLING UNIT FOR CONNECTION WITH AUTOMOBILE AIR CONDITIONER

BACKGROUND OF THE INVENTION

1. Field of the Invention

The present invention generally relates to a portable cooler such as a picnic box or the like having a cooling unit incorporated therein provided with means adapting the cooling unit for connection into the air conditioning system of an automobile or similar vehicle.

2. Description of the Prior Art

Portable coolers with cooling units incorporated therein are known in the prior art. For example, U.S. Pat. No. 3,347,060 to Barkan discloses such a unit but in this arrangement, the refrigerating unit and its power system are self-contained. U.S. Pat. No. 3,505,830 to Koerner discloses a picnic cooler or chest that is communicated with the evaporator housing of the air conditioning system of the automobile so that cool air is discharged interiorly of the picnic box. U.S. Pat. Nos. 2,630,688 to Merkling and 2,540,649 to Boylan disclose a separable connection between an evaporator unit and a compressor-condenser unit but in neither of these patents is the evaporator associated with a portable cooler. U.S. Pat. No. 3,041,852 to Palmer discloses an external cooling unit connected to the refrigerant flow lines of a conventional home refrigerator but in this patent, the external cooling unit is not portable in nature and not provided with quick connect couplings to the existing refrigerator system.

SUMMARY OF THE INVENTION

An object of the present invention is to provide a portable cooler having a cooling unit incorporated therein for quick, detachable connection and communication with a refrigeration system such as an automobile air conditioning system by which the cooling unit and the interior of the portable cooler may be refrigerated.

Another object of the invention is to provide a portable cooler in which the cooling unit is provided with a heat exchange coil immersed in a liquid coolant which has a freezing point below 32° F. thereby enabling the interior of the portable cooler to be lowered to a desired temperature and to provide a cold holding unit which will maintain the interior of the cooler at a lower temperature for an extended period of time.

Still another object of the invention is to provide a portable cooler in which the cooling unit is built in and provided with quick disconnect and connect couplings which may be quickly connected into or disconnected from the refrigerant flow lines of an automobile air conditioning system or the like in order to enable the portable cooler to be easily removed from the trunk area of an automobile so that it may be carried to a picnic area, onto a boat or any other desired location remote from the automobile and readily connected into the air conditioning system of the automobile without requiring the use of any tools or special knowledge with the automobile air conditioning system also incorporating cooperating quick connect and disconnect couplings therein.

Still a further object of the invention is to provide a portable cooler having a cooling unit incorporated therein which eliminates ice storage in the portable cooler thereby enabling more efficient use of the interior of the cooler and also eliminating water from melted ice sloshing around in the interior of the cooler which may in some instances water soak the contents of the cooler or spill into the interior of a trunk or the like of an automobile.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
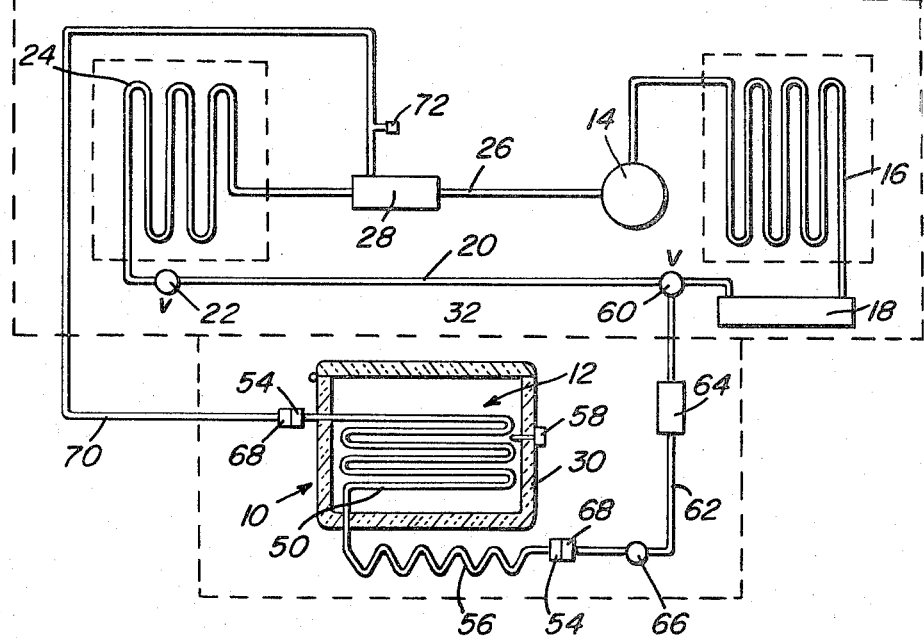
FIG. 1 is schematic view illustrating an automobile air conditioning system with a portable cooler with cooling unit incorporated therein associated therewith.

Referring now specifically to the drawings, FIG. 1 illustrates schematically the association of the portable cooler 10 of the present invention together with the cooling unit 12 therein with a conventional automobile air conditioning system which includes a compressor 14, a condenser 16, a receiver 18, a liquid refrigerant line 20, extending to an expansion valve or capillary tube 22 at the inlet side of an evaporator 24 which communicates with the intake side of the compressor 14 through a gaseous return line 26 and a low or suction side regulating valve 28. Insofar as the air conditioning system in the vehicle is concerned, it is conventional and the portable cooler 10 of the present invention may be connected into the air conditioning system in a manner so that the portable cooler 10 may be situated in the trunk or other suitable space of the automobile depending upon the structure and type of automobile or vehicle.

Figure 2:
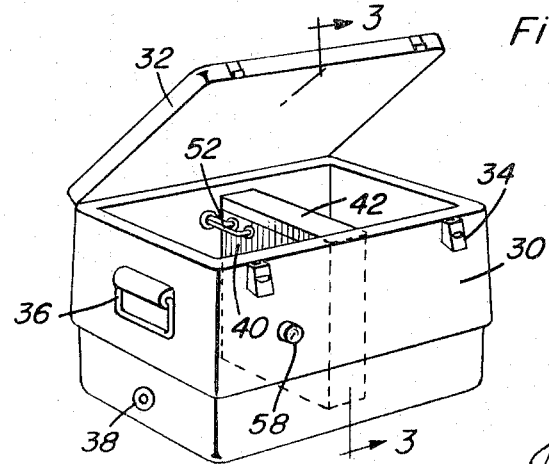
FIG. 2 is a perspective view of the portable cooler with the cooling unit incorporated therein.
Figure 3:
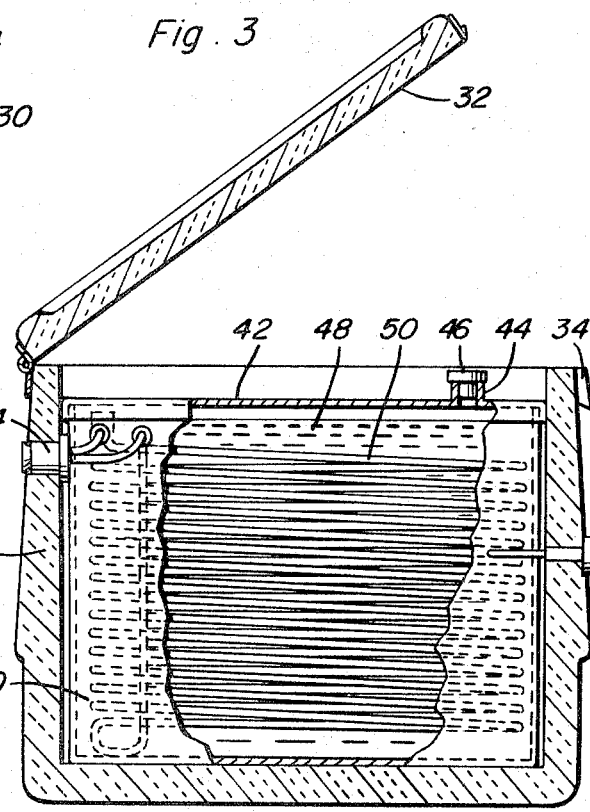
FIG. 3 is a vertical, sectional view, on an enlarged scale, taken substantially upon a plane passing along section line 3—3 of FIG. 2 illustrating the association of the cooling unit within the portable cooler with a portion of the cooling unit broken away.
Figure 4:
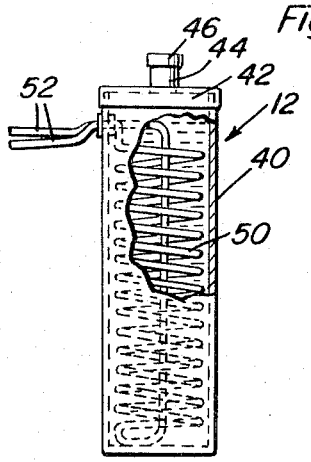
FIG. 4 is an end elevational view of the cooling unit with a portion of the wall broken away illustrating the heat exchange coil therein.

As illustrated in FIGS. 2–4, the portable cooler includes an insulated cabinet 30 having a hinged top closure lid 32 provided thereon with suitable latch mechanisms 34 being provided for retaining the lid 32 in closed position. Any suitable type of carrying handle such as a loop handle 36 may be provided on the end walls of the cabinet and, if desired, a drain opening with suitable plug or closure 38 may be provided in one wall of the cabinet. The cabinet structure is conventional and may be of conventional construction such as spaced metal walls, plastic, expanded plastic or any other suitable type of insulated structure with the size, shape and configuration of the insulated cabinet being variable as desired.

The cooling unit 12 is disposed interiorly of the cabinet 30 and is oriented substantially centrally thereof and forms a partition to divide the interior of the cabinet into two separated spaces although the particular location of the cooling unit may also be varied, that is, it may be oriented along one end wall of the cabinet or along either the front and rear wall or could form the bottom of the cabinet. The cooling unit 12 includes a tank 40 having a top 42 thereon and a filler neck 44 and cap 46 therefor to enable the tank to receive a quantity of liquid coolant. Immersed in the liquid coolant 48 is a heat exchange coil 50 in which the convolutions are spirally oriented and provided with inlet and outlet tubes 52 connected with a quick coupling unit 54 mounted in or otherwise associated with the wall of the cabinet 30. The cooling unit 12 is built in with the quick coupling 54 being fixedly and rigidly secured in a wall of the cabinet 30 with the inlet line or tube including an expansion valve or capillary tube 56 as indicated in the schematic view in FIG. 1 but not illustrated in detail in FIGS. 2–4.

A thermometer 58 may be provided in the wall of the cabinet 30 with a probe or sensing device projecting into the interior of the cabinet to indicate the temperature of the interior of the cooler thereby enabling the temperature of the interior of the cooler to be easily determined. The coolant 48 may be an anti-freeze mixture which will remain in a liquid state or it may be a freezable solution such as water or a eutectic solution which may be frozen or solidified thereby providing a cold hold unit that will maintain the interior of the cabinet at a desired lower temperature for a prolonged period of time.

The intake side of the coil 50 which is in the form of an evaporator is connected to the liquid refrigerant line 20 at the liquid line service valve 60 with the liquid line 62 extending to the coupling 54 including a dryer 64 and a solenoid valve 66 which is normally open together with a coupling 68 that cooperates with the coupling 54. The discharge line 70 is provided also with the coupling 68 and connects into the gaseous return line 26 at the regulating valve 28 and this line may include a charging adapter 72. The lines 62 and 70 having the coupling 68 thereon may be flexible in nature and the coupling 68 and the coupling 54 are constructed such that they can be only connected when properly oriented for proper refrigerant flow through the cooling coil and are constructed in such a manner that air nor any other contaminant will be introduced into the refrigerant flow line when connecting and disconnecting the couplings. The thermometer 58 may be in the form of a thermostatic control to enable control of the temperature in the portable cooler in substantially the same nature as the thermostatic control valve is used in controlling the temperature interiorly of the automobile. While the shape of the cooling unit may vary as well as its size, the use of a cooling unit of rectangular configuration approximately 10 inches high, 13 inches long and 3 ½ inches wide has been found adequate and holds approximately 2 gallons of liquid coolant. This capacity has been found adequate for most purposes in that it will maintain food products and beverages in a desired refrigerated condition for a relatively long period of time even after the portable cooler has been removed from the automobile and is no longer connected with the air conditioning system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable cooler for use in combination with a refrigeration system comprising an insulated portable cabinet, a cooling unit mounted in said cabinet, and quick connect and disconnect coupling means detachably connecting the cooling unit with the refrigeration system for flow of refrigerant through the cooling unit when coupled therewith and enabling the cooling unit and portable cabinet to be carried to a desired location remote from the refrigeration system when the cooling unit is disconnected from the refrigeration system, said refigeration system being the air conditioning system of an automobile with the portable cooler adapted to be mounted in the trunk space or other space within the automobile to enable food products, beverages or the like to be refrigerated when the automobile is being driven over the road and the portable cooler removed from the automobile and carried to a desired location at any time.

2. The structure as defined in claim 1 wherein said cooling unit includes a tank having a liquid coolant therein, a heat exchange coil immersed in said coolant for reducing the temperature of the coolant to a desired lower temperature whereby the coolant will maintain the interior of the insulated cabinet at a reduced temperature for an extended period of time when the cooling unit in the portable cooler has been disconnected from the air conditioning system of the automobile.

3. The structure as defined in claim 2 wherein said tank is disposed transversely of the insulated cabinet to form a partition therein, the quick coupling for the cooling unit being mounted in one wall of the cabinet.

4. The structure as defined in claim 3 wherein said coolant has a freezing temperature below 32° F., said cooling unit including a thermostatically controlled expansion device to control flow of expanding refrigerant through the coil.

5. In combination with an automotive vehicle having an air conditioning system including a refrigerant flow line connecting a compressor, condenser, expansion device and evaporator in serial relation for cooling an enclosed space, that improvement comprising a portable cooler having an evaporator disposed interiorly of an insulated cabinet and detachably connected into the refrigerant flow line between the condenser and expansion device and into the refrigerant flow line between the evaporator of the air conditioning system and the compressor for circulation and expansion of refrigerant therethrough for cooling the interior of the insulated cabinet, and quick coupling means connecting the cooler evaporator with the refrigerant flow line to facilitate removability and portability of the insulated cabinet.

6. The structure as defined in claim 5 wherein said cooler evaporates includes a heat exchange coil immersed in a quantity of liquid coolant which forms a cold hold unit for the insulated cabinet.

7. The structure as defined in claim 6 wherein said cooler evaporator includes an expansion device providing refrigerant expansion through the cooler evaporator, said cold hold unit including a tank extending vertically intermediate the ends of the insulated cabinet to form a partition, said cabinet having a pivotal top closure lid extending from end to end, said quick coupling means being mounted in one wall of said cabinet, said tank including a filler opening and closure in the top thereof below the cabinet lid.

\* \* \* \* \*